US010969017B2

(12) United States Patent
Guo et al.

(10) Patent No.: US 10,969,017 B2
(45) Date of Patent: Apr. 6, 2021

(54) FACE SEAL WITH INSERT (71) Applicant: United Technologies Corporation, Farmington, CT (US)

(72) Inventors: Changsheng Guo, South Windsor, CT (US); Zaffir A. Chaudhry, S. Glastonbury, CT (US); Nasr A. Shuaib, Watertown, MA (US)

(73) Assignee: United Technologies Corporation, Farmington, CT (US)

( * ) Notice: Subject to any disclaimer, the term of this patent is extended or adjusted under 35 U.S.C. 154(b) by 100 days.

(21) Appl. No.: 16/373,165

(22) Filed: Apr. 2, 2019

(65) Prior Publication Data
US 2020/0318740 A1 Oct. 8, 2020

(51) Int. Cl.
*F16J 15/34* (2006.01)
*F01D 11/00* (2006.01)
*F01D 21/00* (2006.01)
*F16N 29/04* (2006.01)

(52) U.S. Cl.
CPC ......... *F16J 15/3492* (2013.01); *F01D 11/003* (2013.01); *F01D 21/003* (2013.01); *F05D 2220/32* (2013.01); *F05D 2260/80* (2013.01); *F16N 29/04* (2013.01)

(58) Field of Classification Search
CPC .... F16J 15/3492; F01D 21/003; F01D 11/003
See application file for complete search history.

(56) References Cited

U.S. PATENT DOCUMENTS

| 4,497,493 | A | * | 2/1985 | Sall | F16J 15/3404 |
| | | | | | 277/306 |
| 5,246,235 | A | * | 9/1993 | Heinzen | F16J 15/16 |
| | | | | | 116/208 |
| 5,540,448 | A | * | 7/1996 | Heinzen | F16J 15/3296 |
| | | | | | 277/321 |
| 6,003,872 | A | * | 12/1999 | Nord | F16J 15/3296 |
| | | | | | 277/317 |
| 6,080,982 | A | * | 6/2000 | Cohen | B63B 79/10 |
| | | | | | 250/227.11 |
| 6,615,639 | B1 | * | 9/2003 | Heinzen | F16J 15/16 |
| | | | | | 116/208 |

(Continued)

FOREIGN PATENT DOCUMENTS

EP  0185134 A1  6/1986
JP  S5754006 A  3/1982

OTHER PUBLICATIONS

Extended European Search Report for EP Application No. 20166974.4, dated Aug. 28, 2020, 7 pages.

(Continued)

*Primary Examiner* — Nicholas L Foster
(74) *Attorney, Agent, or Firm* — Kinney & Lange, P.A.

(57) ABSTRACT

A method of determining wear of a seal element includes rotating a seal plate relative to the seal element and such that the seal plate and the seal element form a rotational sealing interface. The seal element includes an insert embedded in the seal element. A portion of the seal element is worn with a sealing face of the seal plate. The insert is contacted with the sealing face of the seal plate. A portion of the insert is worn to create a wear particle of the insert. The presence of the wear particle in a lubrication oil is sensed with an oil monitoring system.

5 Claims, 4 Drawing Sheets

(56) References Cited

U.S. PATENT DOCUMENTS

| | | | |
|---|---|---|---|
| 7,405,818 B2* | 7/2008 | Heinzen | F16J 15/3296 |
| | | | 356/246 |
| 9,169,971 B2 | 10/2015 | Sammataro et al. | |
| 9,423,032 B2* | 8/2016 | Colverson | F16J 15/3404 |
| 2004/0075218 A1* | 4/2004 | Heinzen | F16J 15/3492 |
| | | | 277/321 |
| 2014/0325791 A1* | 11/2014 | Colverson | F16J 15/3404 |
| | | | 16/2.2 |
| 2019/0040959 A1 | 2/2019 | Sommers | |

OTHER PUBLICATIONS

"MS4000—Real-time early damage detection for high temperature industrial equipment that tells you what you need to know, when you need to know it", from <https://www.gastops.com/products/metalscan/ms4000-2/>, 4 pages.

* cited by examiner

FACE SEAL WITH INSERT

BACKGROUND

The present disclosure relates to seal assemblies. More particularly, the present disclosure relates to multi-material carbon face seals.

In existing bearing assemblies for aircraft bearing compartments, a dry face seal often provides a critical sealing interface within the bearing compartment. If the dry face seal loses its sealing capability, oil and mist within the compartment can leak into the bleed air. It is beneficial to have a dry seal configuration that provides a fully sealed interface at all times.

Occasionally, it is possible for a dry face seal to lose its sealing capability due to excessive wear of the seal. In some instances, metal-to-metal contact and wear of seal carriers and seal plates can generate metal particles as well as sparks due to frictional heating which may ignite lubrication oil in the compartment.

SUMMARY

A method of determining wear of a seal element includes rotating a seal plate relative to the seal element and such that the seal plate and the seal element form a rotational sealing interface. The seal element includes an insert embedded in the seal element. A portion of the seal element is worn with a sealing face of the seal plate. The insert is contacted with the sealing face of the seal plate. A portion of the insert is worn to create a wear particle of the insert. The presence of the wear particle in a lubrication oil is sensed with an oil monitoring system.

A seal assembly for a bearing compartment of a turbine engine includes a seal plate, a seal carrier, a seal element, and an insert. The seal plate includes a first sealing face on a first axial end of the seal plate. The seal carrier is disposed axially from and coaxially with the seal plate. The seal element extends annularly and includes a second sealing face on a first axial end of the seal element. The seal carrier is in contact with the seal element and holds the seal element in place against the seal plate such that the first sealing face of the seal plate and the second sealing face of the seal element form a sealing interface. The insert is disposed in the seal element such that the insert is embedded in the seal element at a predetermined distance from the second sealing face.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A seal assembly can be modified such that the seal carrier of the seal assembly comes into gradual and gentle contact with the seal plate just before the seal is fully worn out. In this arrangement, metal-to-mental contact between the seal carrier and the seal plate can generate particles of ablated metal that displace into lubricating oil. When an oil monitoring system picks up any traces of metal in the oil, it will alert the engine monitoring module about the seal condition. A concern of this modification is associated with the metal-to-metal rub (slide), as sparks could, under some circumstances, be generated due to the metal-to-metal rubbing of the seal plate and the seal carrier. There can also be a concern with respect to whether the sparks generated will be severe enough to ignite the lubrication oil.

A carbon seal is disclosed herein that includes an insert embedded in the carbon seal at a set depth, such that when wear of the carbon seal reaches that pre-determined depth, wear particles of the insert will be disposed into the lubrication oil and the oil monitoring system will alert the engine control/pilot about the status of the seal.

Figure 1:
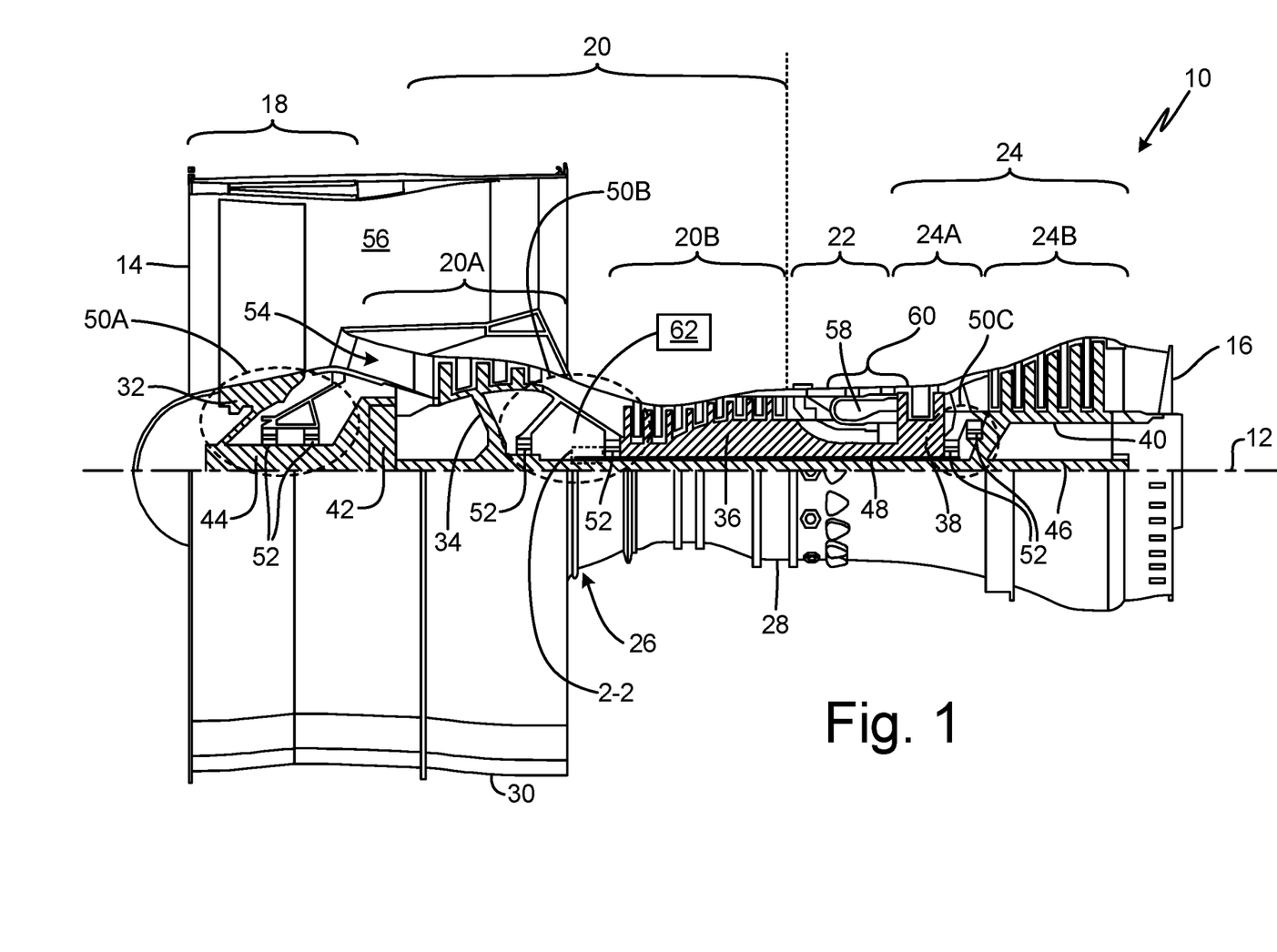
FIG. 1 is a quarter section view of a gas turbine engine.

FIG. 1 shows a side elevation cutaway view of gas turbine engine 10 and includes axial centerline 12, upstream airflow inlet 14, downstream airflow exhaust 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with inner case 28 (e.g., a core case) and outer case 30 (e.g., a fan case)), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, combustor 60, and oil debris monitor 62 ("ODM 62").

Gas turbine engine 10 extends along axial centerline 12 between upstream airflow inlet 14 and downstream airflow exhaust 16. Gas turbine engine 10 includes fan section 18, compressor section 20, combustor section 22, and turbine section 24. Compressor section 20 includes LPC section 20A and HPC section 20B. Turbine section 24 includes HPT section 24A and LPT section 24B.

Fan section 18, compressor section 20, combustor section 22, and turbine section 24 are arranged sequentially along centerline 12 within engine housing 26. Engine housing 26 includes inner case 28 (e.g., a core case) and outer case 30 (e.g., a fan case). Inner case 28 may house one or more of fan section 18, compressor 20, combustor section 22, and turbine section 24 (e.g., an engine core). Outer case 30 may house at least fan section 18. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 32 is connected to gear train 42, for example, through fan shaft 44. Gear train 42 and LPC rotor 34 are connected to and driven by LPT rotor 40 through low speed shaft 46. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut. ODM 62 is an oil monitoring system configured to monitor the contents of lubrication oil. In this non-limiting embodiment, ODM 62 is fluidly connected to bearing compartment 50B. In the illustrated example, ODM 62 is shown schematically as a simplified block. In this example, ODM 62 includes a sensor that senses for the presence of particulates in lubrication oil within gas turbine engine 10.

During operation, air enters gas turbine engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between inner case 28 and outer case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited and combustion products thereof expand and flow through and sequentially cause HPT rotor 38 and LPT rotor 40 to rotate. The rotations of HPT rotor 38 and LPT rotor 40 drive rotation of LPC rotor 34 and HPC rotor 36, respectively and compression of the air received from core gas path 54. The rotation of LPT rotor 40 also drives rotation of fan rotor 32, which propels bypass air through and out of bypass gas path 56. Also during operation, ODM 62 monitors lubrication oil in order to sense the presence of wear particles in the lubrication oil.

Figure 2A:
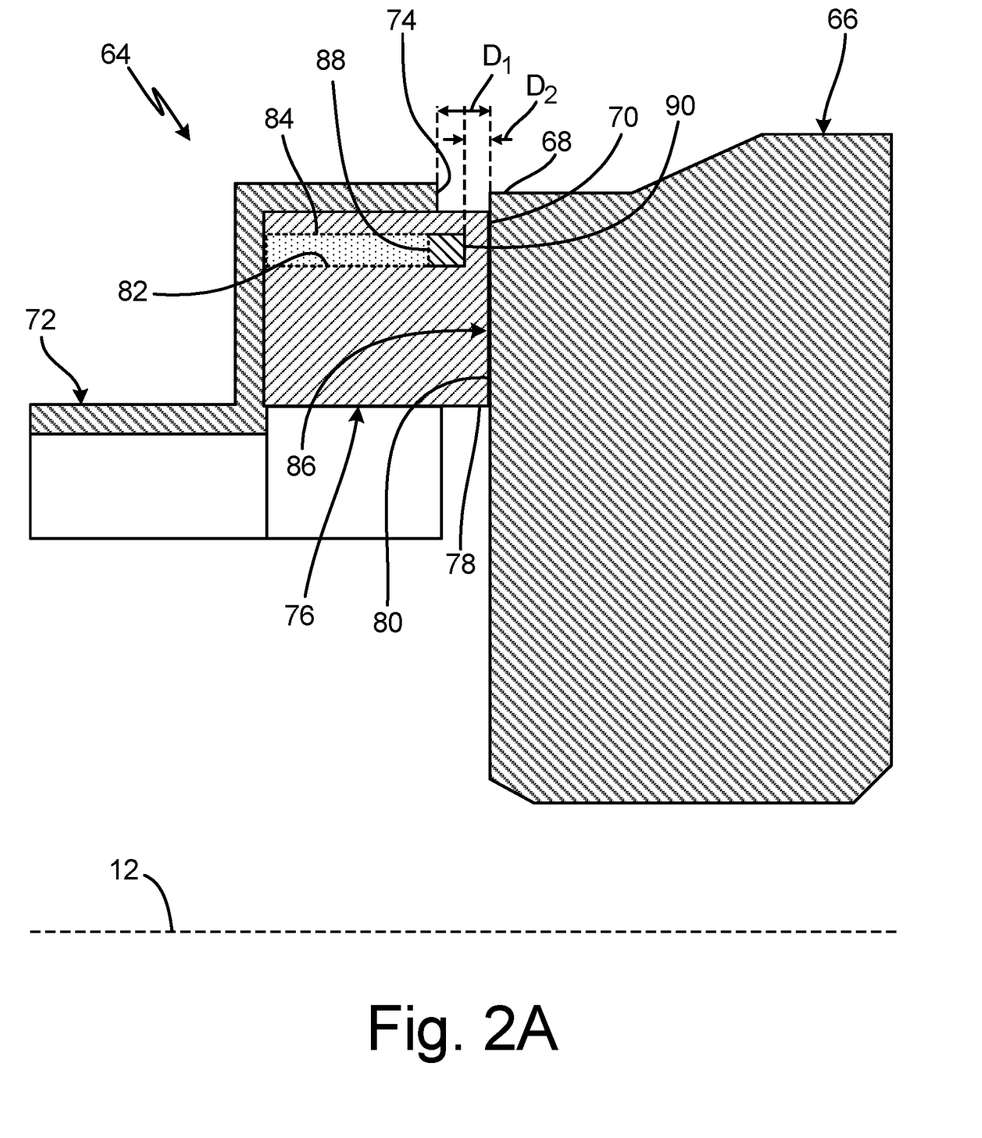
FIG. 2A is an enlarged cross-section view of portion 2-2 in FIG. 1 illustrating a seal assembly in a first, un-worn state.

FIG. 2A is an enlarged cross-section view of portion 2-2 in FIG. 1 illustrating seal assembly 64 in a first, un-worn state. FIG. 2A shows axial centerline 12, seal assembly 64, seal plate 66 (with first axial end 68 and first sealing face 70), seal carrier 72 (with axial end-face 74), seal element 76 (with first axial end 78, second sealing face 80, and hole 82), filler 84, sealing interface 86, insert 88 (with axial end-face 90), first distance $D_1$, and second distance $D_2$.

Seal plate 66 is a seal element for rotary applications. In this embodiment, seal plate 66 is a seat for a seal. First axial end 68 is an axial end of seal plate 66. First sealing face 70 is an end-wall or face of seal plate 66. Seal carrier 72 is an annular containment ring of solid material. In this embodiment, seal carrier 72 includes a metallic material. Axial end-face 74 is an axial end of seal carrier 72. Seal element 76 is a face seal. In this embodiment, seal element 76 is a carbon dry face seal. First axial end 78 is an axial end of seal element 76. Second sealing face 80 is an end-wall or face of seal element 76. Hole 82 is an opening or passage. In this example, hole 82 is formed via machining or drilling into an axial end-face of seal element 76 that is on an opposite end of seal element 76 from first axial end 78. Filler 84 is a solid substance. In this embodiment, filler 84 can be a solidified epoxy or other bonding material such as a polymer.

Sealing interface 86 is an interface between first sealing face 70 of seal plate 66 and second sealing face 80 of seal element 76. Insert 88 is a piece of solid material. In this non-limiting embodiment, insert 88 is a plug in the shape of a cylinder. Also in this embodiment, a material of insert 88 includes a material with a low propensity for spark creation. For example, the material of insert 88 includes a lesser propensity for spark creation than a material of seal carrier 72. Additionally, the material of insert 88 can include a particular ferromagnetic or non-ferromagnetic material, such that the magnetism of the material of insert 88 is different that a magnetism of the material of seal element 76. Axial end-face 90 is an end-wall or face of insert 88. First distance $D_1$ is a distance between first sealing face 70 of seal plate 66 and axial end-face 74 of seal carrier 72. Second distance $D_2$ is a distance between first sealing face 70 of seal plate 66 and axial end-face 90 of insert 88.

In this embodiment, seal assembly 64 is disposed in bearing compartment 50B. Although seal assembly 64 is discussed as being disposed in bearing compartment 50B, seal assembly 64 can be disposed in any one of bearing compartments 50A, 50B, 50C, or another compartment of gas turbine engine 10. In this embodiment, seal plate 66 can be disposed about one of fan shaft 44, low speed shaft 46, or high speed shaft 48 of gas turbine engine 10. First sealing face 70 at first axial end 68 of seal plate 66 is in contact with second sealing face 80 at first axial end 78 of seal element 76. Seal carrier 72 is disposed around and in contact with seal element 76. Axial end-face 74 of seal carrier 72 is separated from first sealing face 70 of seal plate 66 by first distance $D_1$.

Seal element 76 is fit within a portion of seal carrier 72 and is in contact with seal plate 66. Second sealing face 80 at first axial end 78 is in sealing engagement with first sealing face 70 at first axial end 68 of seal plate 66. Hole 82 is disposed in a portion of seal element 76. In the illustrated example, hole 82 is oriented axially parallel relative to axial centerline 12, to seal plate 66, to seal carrier 72, and to seal element 76. Filler 84 is disposed within a portion of hole 82 that is not occupied by insert 88. Sealing interface 86 is located at a plane where first sealing face 70 of seal plate 66 and second sealing face 80 of seal element 76 are in contact.

In the illustrated embodiment, an axial depth of insert 88 extends only a portion of the axial length of seal element 76. In other non-limiting embodiment, insert 88 can extend the full axial length or a majority of the full axial length of seal element 76. Insert 88 is disposed within hole 82. In the illustrated example, a single insert 88 is inserted in a single hole 82. In other embodiments, seal element 76 can include more than one hole 82 each with their own insert 88, and with the distances between the multiple inserts 88 and seal plate 66 varying between the different inserts 88. In this embodiment, axial end-face 90 of insert 88 is separated from second distance $D_2$ from first sealing face 70 of seal plate 66. In this illustrated embodiment, first distance $D_1$ is greater than second distance $D_2$ and second distance $D_2$ is greater than zero.

First sealing face 70 at first axial end 68 of seal plate 66 rotates relative to seal element 76 and forms sealing interface 86 with second sealing face 80 at first axial end 78 of seal element 76. Seal carrier 72 holds seal element 76 in place against seal plate 66. In this example, seal carrier 72 contains seal element 70 both radially and axially. Second sealing face 80 at first axial end 78 of seal element 76 provides a face seal for a rotating interface (e.g., sealing interface 86). Hole 82 provides an opening in which insert 88 is mounted. Filler 84 holds insert 88 in place within hole 82 and prevents insert 88 from moving out of hole 82. Sealing interface 86 prevents transmission of a fluid across sealing interface 86 during operation of engine 10.

As will be discussed with respect to FIG. 2B, insert 88 provides wear particles characteristic to insert 88 in such a way that indicates that seal element 76 has worn down an unacceptable amount. Axial end-face 90 of insert 88 remains a positive distance from first sealing face 70 of seal plate 66 until a portion of seal element 76 between insert 88 and seal plate 66 is worn down. In another example with multiple inserts 88 disposed in sealing element 76, inserts 88 can be disposed at different distances from first sealing face 70 of seal plate 66 so as to provide a staging effect as between the release of wear particles of the various inserts 88. Different materials can be selected between the various multiple inserts 88, such that ODM 62 can detect the presence of the individual inserts 88 and differentiate between the different materials of the different inserts 88. As such, different wear depths of seal element 76 could be determined based on the sensed presence of particular material of the various inserts 88 in the lubrication oil.

When the wear of seal element 76 reaches the predetermined depth (i.e., the position of axial end-face 90 of insert 88), wear particles of insert 88 will be disposed into the lubrication oil. These wear particles of insert 88 are then sensed by ODM 62 that monitors the lubrication oil for the presence of particulates. For example, ODM 62 can monitor for and sense the presence of particles containing a particular level of ferromagnetism (and/or non-ferromagnetism). When wear particles of insert 88 are sensed in the lubrication oil, ODM 62 will provide a notification so as to alert engine control and/or the pilot about the status of seal assembly 64. The selection of the material of insert 88 will make sure that the material of insert 88 does not generate sparks in the event of seal plate 66 wearing against insert 88. Insert 88 and its associated wear particles will be compatible with the oil system management (e.g., no harm to the oil). The material of insert 88 is also sensitive for ODM 62 to pick up the presence of wear particles of insert 88.

Figure 2B:
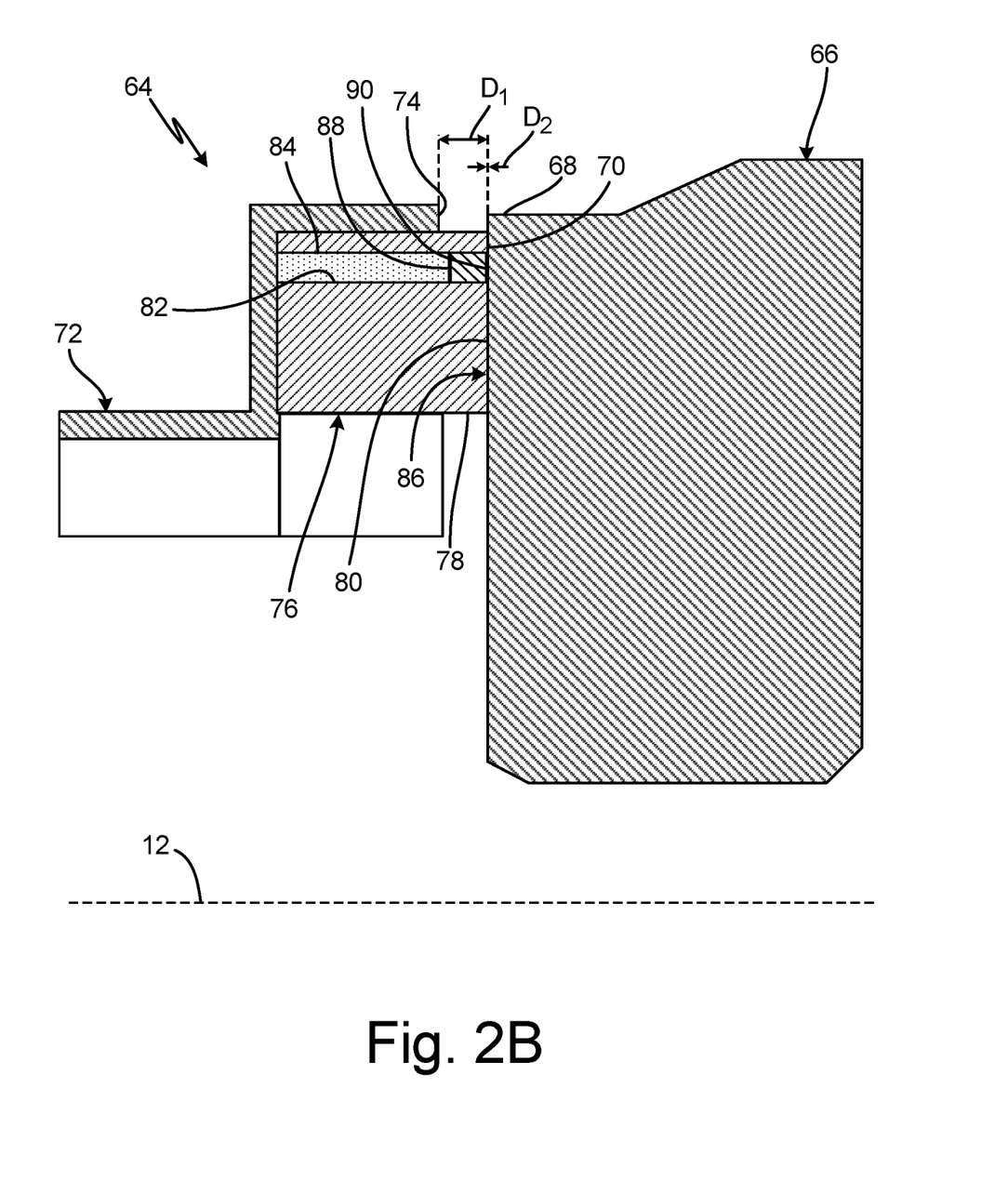
FIG. 2B is an enlarged cross-section view of portion 2-2 in FIG. 1 illustrating a seal assembly in a second, worn state with a seal plate into contact with an insert of the seal element.

FIG. 2B is an enlarged cross-section view of portion 2-2 in FIG. 1 illustrating seal assembly 64 in a second, worn state with seal plate 66 into contact with insert 88 of seal element 76. FIG. 2 shows axial centerline 12, seal assembly 64, seal plate 66 (with first axial end 68 and first sealing face 70), seal carrier 72 (with axial end-face 74), seal element 76 (with first axial end 78, second sealing face 80, and hole 82), filler 84, sealing interface 86, insert 88 (with axial end-face 90), first distance $D_1$, and second distance $D_2$.

In the illustrated embodiment, a first coefficient of friction between seal plate 66 and seal carrier 72 is less than a second coefficient of friction between seal plate 66 and insert 88. In the illustrated embodiment, seal element 76 has been worn down due to friction at sealing interface 86 between seal element 76 and seal plate 66. For example, in FIG. 2B second distance $D_2$ is shown as zero. Here, first distance $D_1$ is shown as having a value greater than zero such that axial end-face 74 of seal carrier 72 is out of contact with first sealing face 70 of seal plate 66.

With the second coefficient of friction between seal plate 66 and insert 88 being greater than the first coefficient of friction between seal plate 66 and seal carrier 72, friction caused by relative rotational movement between seal plate 66 and insert 88 causes an amount of wear particles to be dislodged from insert 88 and dispersed into the lubrication oil of bearing compartment 50B.

For example, in one limiting embodiment, a method of determining wear of seal element 76 can include the following. Seal plate 66 is rotated relative to seal element 76. A flow of lubrication oil is monitored with ODM 62. A portion of seal element 76 is worn by first sealing face 70 of seal plate 66. Insert 88 is contacted with first sealing face 70 of seal plate 66. A portion of insert 88 is worn to create a wear particle of insert 88. The presence of the wear particle of insert 88 in a lubrication oil is sensed with ODM 62. In one example, sensing the presence of the wear particle of insert 88 in the lubrication oil includes scanning the lubrication oil with a sensor to detect the presence of objects that are not the lubrication oil. In another example, sensing the presence of the wear particle of insert 88 in the lubrication oil includes scanning the lubrication oil with the sensor to detect the presence of a particle including the same material composition as a material of insert 88. Notification of the presence of the wear particle in the lubrication oil is provided by ODM 62.

Seal assembly 64 with insert 88 enables monitoring and detection of wear stages of seal element 76. For example, ODM 62 is able to detect when seal plate 66 comes into contact with insert 88 by way of detecting wear particles of insert 88 in the lubrication oil. The ability to detect the presence of wear particles of insert 88 enables providing an alert that seal element 76 has reached a threshold limit indicative of the stage prior to seal plate 66 coming into contact with seal carrier 72. Given this, incorporating insert 88 into seal element 76 allows for prevention of contact between seal plate 66 and seal carrier 72 thereby preventing wear debris from seal carrier 72 being emitted into the lubrication oil and also preventing formation of sparks caused by contact between seal plate 66 and seal carrier 72.

As such, bearing assembly 64 with insert 88 provides the benefit of better reliability and earlier debris detection by ODM 62. Also, engine repairs can be scheduled and planned ahead of time instead of waiting for seal plate 66 to come into contact with seal carrier 72 and seal carrier 72 being damaged. Additionally, bearing assembly 64 with insert 88 avoids events of oil loss and fumes in the cabin that are considered safety risks to the operation of the aircraft.

Figure 3:
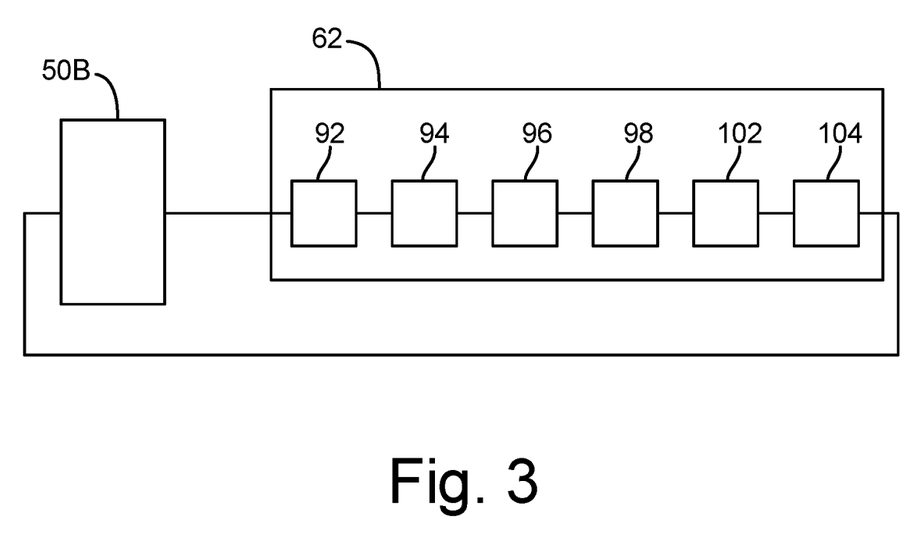
FIG. 3 is a simplified schematic view of an oil debris monitoring system that is connected to a bearing compartment of the gas turbine engine.

FIG. 3 is a simplified schematic illustration of oil debris monitoring system 62 that is connected to bearing compartment 50B and shows sensor 92, detector 94, first pump 96, filter 98, tank 100, and second pump 102.

Sensor 92 is a device for sensing the presence of particulate in lubrication oil. Detector 94 is a device for detecting particulates in the lubrication oil. First pump 96 and second pump 102 are devices for creating pressure in the lubrication oil passing through ODM 62. Filter 98 is a device for removing particulate from the flow of lubrication oil. Tank 100 is a container for temporarily storing an amount of the lubrication oil.

Bearing compartment 50B, sensor 92, detector 94, first pump 96, filter 98, tank 100, and second pump 102 of ODM 62 are connected in a series flow arrangement as shown in FIG. 3. During operation of gas turbine engine 10, a flow of lubrication oil is drawn out of bearing compartment 50B to ODM 62. Once the flow of lubrication oil enters ODM 62, the flow of lubrication oil passes sequentially to sensor 92, to detector 94, to first pump 96, to filter 98, to tank 100, to second pump 102, and then back into bearing compartment 50B. In another example, any one or all of sensor 92, detector 94, first pump 96, filter 98, tank 100, and/or second pump 102 of ODM 62 can be connected to a controller via wired or wireless communication.

For example, in one limiting embodiment, a method of determining wear of seal element 76 can include the following. Seal plate 66 is rotated relative to seal element 76. A flow of lubrication oil is monitored with ODM 62. A portion of seal element 76 is worn by first sealing face 70 of seal plate 66. Insert 88 is contacted with first sealing face 70 of seal plate 66. A portion of insert 88 is worn to create a wear particle of insert 88. The presence of the wear particle of insert 88 in a lubrication oil is sensed with ODM 62. In one example, sensing the presence of the wear particle of insert 88 in the lubrication oil includes scanning the lubrication oil with sensor 92 and/or detector 94 to detect the presence of objects that are not the lubrication oil. In another example, sensing the presence of the wear particle of insert 88 in the lubrication oil includes scanning the lubrication oil with sensor 92 and/or detector 94 to detect the presence of a particle including the same material composition as a material of insert 88. In one non-limiting example, detecting the presence of a particle including the same material composition as a material of insert 88 can include determining a magnetism of the particle and comparing that level of magnetism to the known magnetism of insert 88. Once the presence of a wear particle of insert 88 in the lubrication oil is determined, notification of the presence of the wear particle in the lubrication oil is provided by ODM 62.

Discussion of Possible Embodiments

A method of determining wear of a seal element includes rotating a seal plate relative to the seal element and such that the seal plate and the seal element form a rotational sealing interface. The seal element includes an insert embedded in the seal element. A portion of the seal element is worn with a sealing face of the seal plate. The insert is contacted with the sealing face of the seal plate. A portion of the insert is worn to create a wear particle of the insert. The presence of the wear particle in a lubrication oil is sensed with an oil monitoring system.

The method of the preceding paragraph can optionally include, additionally and/or alternatively, any one or more of the following steps, features, configurations and/or additional components.

A flow of the lubrication oil can be monitored with the oil monitoring system.

Notification of the presence of the wear particle in the lubrication oil can be provided with the oil monitoring system.

The lubrication oil can be scanned with a sensor to detect the presence of objects that are not the lubrication oil.

The lubrication oil can be scanned with the sensor to detect the presence of a particle including the same material composition as a material of the insert.

A seal assembly can be modified such that the seal carrier of the seal assembly comes into gradual and gentle contact with the seal plate just before the seal is fully worn out. In this arrangement, metal-to-mental contact between the seal carrier and the seal plate can generate particles of ablated metal that displace into lubricating oil. When an oil monitoring system picks up any traces of metal in the oil, it will alert the engine monitoring module about the seal condition. A concern of this modification is associated with the metal-to-metal rub (slide), as sparks could, under some circumstances, be generated due to the metal-to-metal rubbing of the seal plate and the seal carrier. There can also be a concern with respect to whether the sparks generated will be severe enough to ignite the lubrication oil.

The assembly of the preceding paragraph can optionally include, additionally and/or alternatively, any one or more of the following features, configurations and/or additional components.

A first coefficient of friction between the seal plate and the seal carrier can be less than a second coefficient of friction between the seal plate and the insert.

The insert can comprise a material with a lesser propensity for spark creation than a material of the seal carrier.

The seal element can comprises a hole extending axially through a portion of the seal element, wherein the insert can be disposed in the hole.

A remaining portion of the hole can comprise a filler material that can hold the insert in a fixed position in the hole.

The seal carrier can include an axial end-face that faces towards and/or that is disposed a first distance from the first sealing face of the seal plate, wherein the insert can include an axial end-face that faces towards and/or that is disposed a second distance from the first sealing face of the seal plate, wherein the second distance can be less than the first distance.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly for a bearing compartment of a turbine engine, the seal assembly comprising:
   a seal plate comprising a first sealing face on a first axial end of the seal plate;
   a seal carrier disposed axially from and coaxially with the seal plate;
   a seal element extending annularly, wherein the seal element comprises a second sealing face on a first axial end of the seal element, wherein the seal carrier is in contact with the seal element and holds the seal element in place against the seal plate such that the first sealing face of the seal plate and the second sealing face of the seal element form a sealing interface; and
   an insert disposed in the seal element such that the insert is embedded in the seal element at a predetermined distance from the second sealing face;
   wherein a first coefficient of friction between the seal plate and the seal carrier is less than a second coefficient of friction between the seal plate and the insert.

2. The seal assembly of claim 1, wherein the insert comprises a material with a lesser propensity for spark creation than a material of the seal carrier.

3. The seal assembly of claim 1, wherein the seal element comprises a hole extending axially through a portion of the seal element, wherein the insert is disposed in the hole.

4. The seal assembly of claim 3, wherein a remaining portion of the hole comprises a filler material that holds the insert in a fixed position in the hole.

5. The seal assembly of claim 1, wherein the seal carrier includes an axial end-face that faces towards and that is disposed a first distance from the first sealing face of the seal plate, wherein the insert includes an axial end-face that faces towards and that is disposed a second distance from the first sealing face of the seal plate, wherein the second distance is less than the first distance.

* * * * *